United States Patent [19]
Imanishi et al.

[11] Patent Number: 5,284,115
[45] Date of Patent: Feb. 8, 1994

[54] COOLING SYSTEM FOR A WORKING VEHICLE

[75] Inventors: Ryozo Imanishi; Nobuyuki Yamashita; Katsuhiko Uemura, all of Sakai, Japan

[73] Assignee: Kubota Corporation, Osaka, Japan

[21] Appl. No.: 81,517

[22] Filed: Jun. 23, 1993

[30] Foreign Application Priority Data

Sep. 8, 1992 [JP] Japan .................. 4-239453

[51] Int. Cl.⁵ .............................. F01P 1/02
[52] U.S. Cl. ..................... 123/41.7; 123/41.65; 123/198 E; 180/68.1; 180/900; 60/320
[58] Field of Search ............. 123/41.56, 41.63, 41.65, 123/41.7, 198 E; 180/68.1, 68.2, 900

[56] References Cited

U.S. PATENT DOCUMENTS

| | | | |
|---|---|---|---|
| 4,862,981 | 9/1989 | Fujikawa et al. | 180/68.4 |
| 4,891,940 | 1/1990 | Tamba et al. | 60/320 |
| 5,029,668 | 7/1991 | Murakawa et al. | 181/240 |
| 5,113,819 | 5/1992 | Murakawa et al. | 123/198 E |

*Primary Examiner*—Noah P. Kamen
*Attorney, Agent, or Firm*—Webb, Burden, Ziesenheim & Webb

[57] ABSTRACT

A cooling structure for a motor section of a working vehicle with an engine having a vertical output shaft and mounted in an engine hood having an ambient air intake opening defined in an upper surface thereof, and a fan disposed above the engine to draw in cooling air. The cooling air is guided by an air guide cover to flow to a cylinder head and a carburetor attached to a side wall of the cylinder head. The motor section further includes a muffler disposed adjacent and below the carburetor. A muffler cover is disposed between the carburetor and muffler. Part of the air having cooled the carburetor is used to cool an upper surface of the muffler cover. The remaining part of the air having cooled the carburetor is directed under the muffler cover for use in cooling the muffler.

7 Claims, 4 Drawing Sheets

COOLING SYSTEM FOR A WORKING VEHICLE

BACKGROUND OF THE INVENTION

1. Field of the Invention

The present invention relates to a structure of a motor section of a working vehicle including a hood covering the motor section and defining an air intake opening in an upper surface thereof, an air-cooled engine mounted in the hood and having a vertical output shaft, a fan disposed above the engine to draw in ambient air, an air guide cover for guiding the air to the cylinder head of the engine and a carburetor disposed laterally of the cylinder head, and a muffler disposed below and adjacent the carburetor.

2. Description of the Related Art

In a conventional structure of a motor section of a working vehicle such as a riding type lawn mower, the muffler is usually surrounded by a muffler cover to stop heat of the muffler reaching other devices arranged around the engine. Consequently, this structure has the drawback that grass particles and dust entrained by engine cooling air tend to accumulate on an upper surface of the muffler cover. Further, in summertime, for example, radiant heat of the muffler tends to pass through the muffler cover to produce a high temperature condition in an engine room. As a result, the carburetor becomes overheated, and particles of air mixed into a fuel are thermally expanded to form bubbles. This may cause a vapor lock, hampering proper fuel supply.

It is conceivable to change position of the muffler in order to overcome the above inconveniences, i.e. to avoid heating of the carburetor due to the radiant heat of the muffler and accumulation of grass particles and dust on the muffler cover. However, this would necessitate rearrangement of the devices associated with the engine inside the hood. Such a rearrangement would involve an extensive change in design.

SUMMARY OF THE INVENTION

The object of the present invention is to provide a simple structure to overcome the above drawbacks without a design change involving rearrangement of engine-related devices in a hood.

The above object is fulfilled, according to the present invention, by a construction including (1) a muffler cover vertically separating a carburetor and a muffler to guide cooling air flowing past an engine to a muffler, and (2) an air passage for allowing part of the cooling air supplied to the carburetor to flow along an upper surface of the muffler cover and out of a hood.

With the above construction, an engine cooling fan draws cooling air in through an ambient air intake opening, and directs the cooling air to an air guide cover disposed below the cooling fan. The cooling air flows through the air guide cover, and cools the engine and then the carburetor. A large part of the air having cooled the carburetor flows along the air passage formed on the upper surface of the muffler cover. This part of the air cools the muffler cover, thereby to suppress radiant heat of the muffler reaching the carburetor.

Moreover, grass particles, dust and the like tending to accumulate on the upper surface of the muffler cover are blown out by the cooling air flowing from the carburetor.

The other part of the cooling air having cooled the carburetor is guided to a lower surface of the muffler cover instead of flowing through the air passage on the upper surface of the muffler cover. This part of the air flows through a passage along outer surfaces of the muffler and out of the hood, thereby cooling the muffler.

Thus, the simple construction including the muffler cover for heat-shielding the carburetor effectively avoids a vapor lock of the carburetor. This is achieved without necessitating rearrangement of the engine-related components inside the hood. In addition, the cooling air having cooled the carburetor is utilized to remove dust and the like which would otherwise accumulate on the upper surface of the muffler cover and could burn thereon.

The foregoing and other objects, features and advantages of the invention will be apparent from the following more particular description of the preferred embodiment of the invention, as illustrated in the accompanying drawings.

DETAILED DESCRIPTION OF THE PREFERRED EMBODIMENT

An embodiment of the present invention will be described hereinafter with reference to the drawings.

Figure 1:
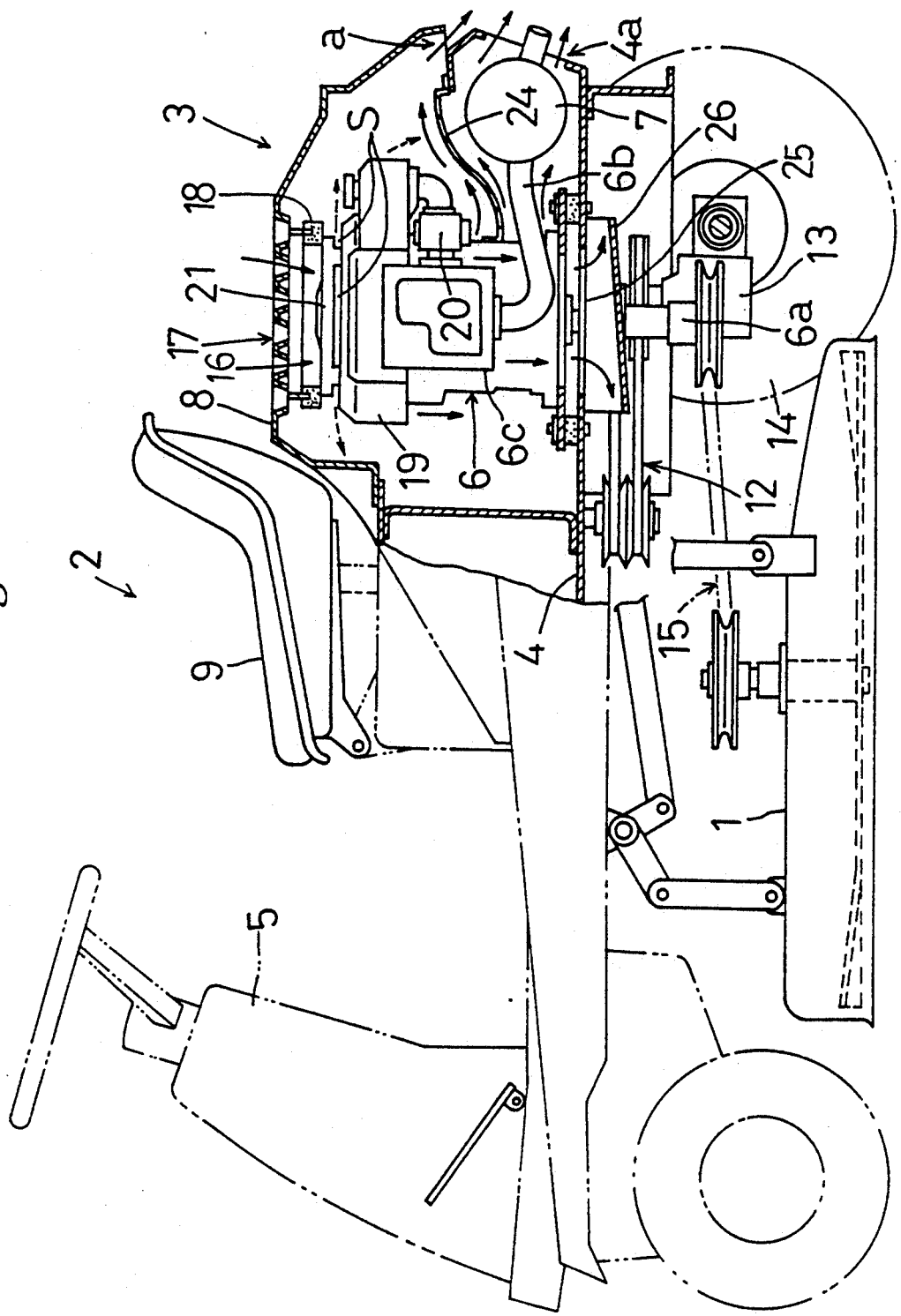
FIG. 1 is a side elevation, partly in section, of a lawn mower according to the present invention.

FIG. 1 shows a riding lawn mower which is one example of working vehicles. This lawn mower has a grass cutting unit 1 vertically adjustably connected to a lower middle position of a vehicle body. The mower is movable while engaging in a grass cutting operation by supplying power from the vehicle body to the grass cutting unit 1.

The vehicle body includes a riding control section 2 disposed on a forward portion thereof, and a motor section 3 on a rearward portion. Specifically, the vehicle body includes a plate-like body frame 4 extending substantially through a full fore and aft length thereof, and a steering box 5 erected on a front position of the body frame 4. The body frame 4 further supports, on a rearward portion thereof, an air-cooled engine 6 having a vertical output shaft 6a, and various engine-related devices such as a muffler 7. These components constitute the motor section 3 which is enclosed in a hood 8.

Figure 3:
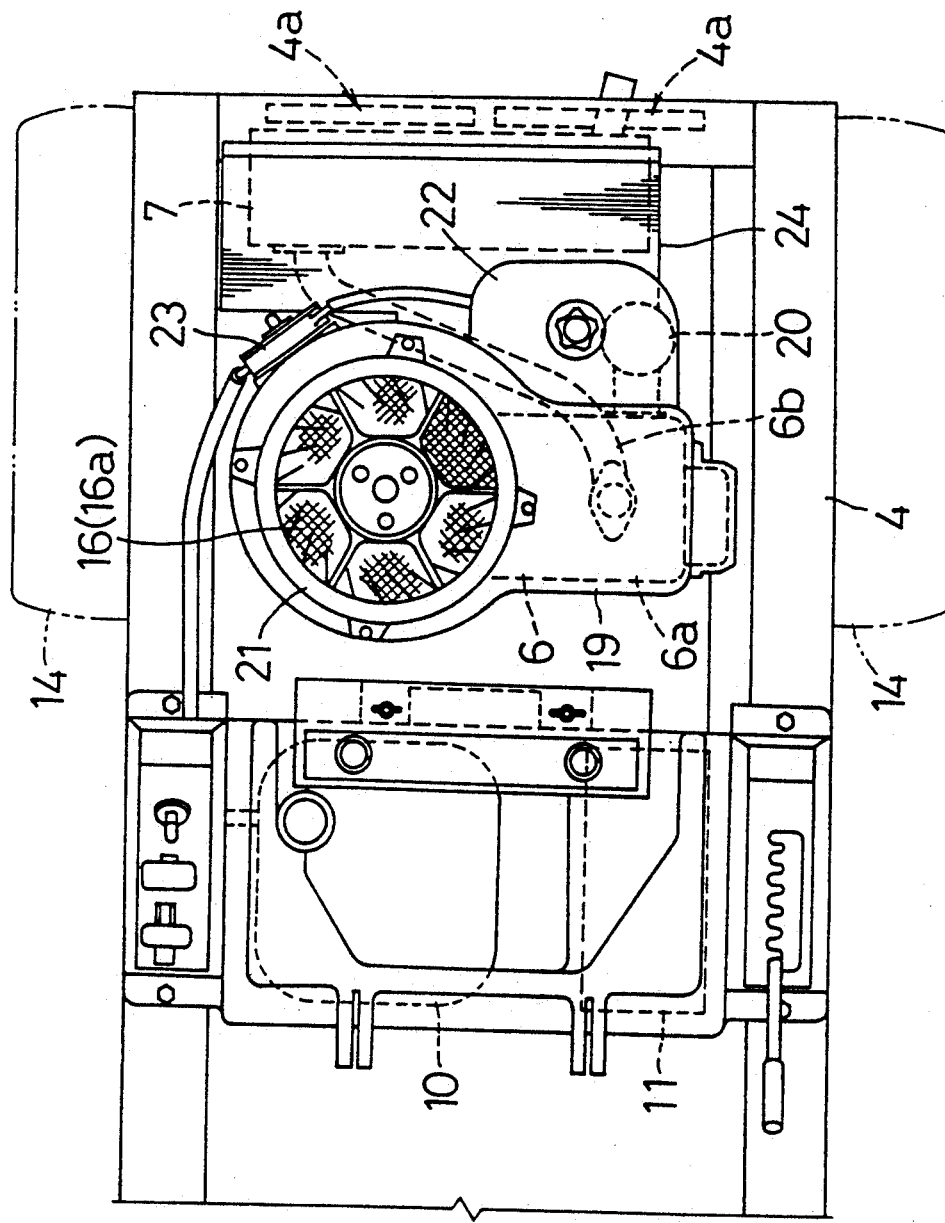
FIG. 3 is a plan view showing the interior of a hood.

A driver's seat 9 is disposed forwardly of the hood 8. Below the driver's seat 9 are a fuel tank 10 and a battery 11 arranged sideways as shown in FIG. 3.

As shown in FIG. 1, the mower is driven by power of the engine 6 transmitted from a lower end of the output shaft 6a through a belt transmission 12 and a hydrostatic stepless transmission 13 to right and left rear wheels 14. The power of the engine 6 is transmitted also to the grass cutting unit 1 through a belt transmission 15.

As shown in FIG. 1, a cooling fan 16 is attached to an upper end of the engine output shaft 6a to draw engine cooling air through an ambient air intake opening 17 formed in an upper surface of the hood 8. The incoming air is guided by an annular shielding cover 18 fixed to an inner surface of the hood 9 and an air guide cover 19 surrounding an upper part of the engine 6, to flow to a cylinder head 6c and a carburetor 20 fixed laterally of the cylinder head 6c. Subsequently, the cooling air is exhausted downwardly from a position below the air guide cover 19.

Figure 4:
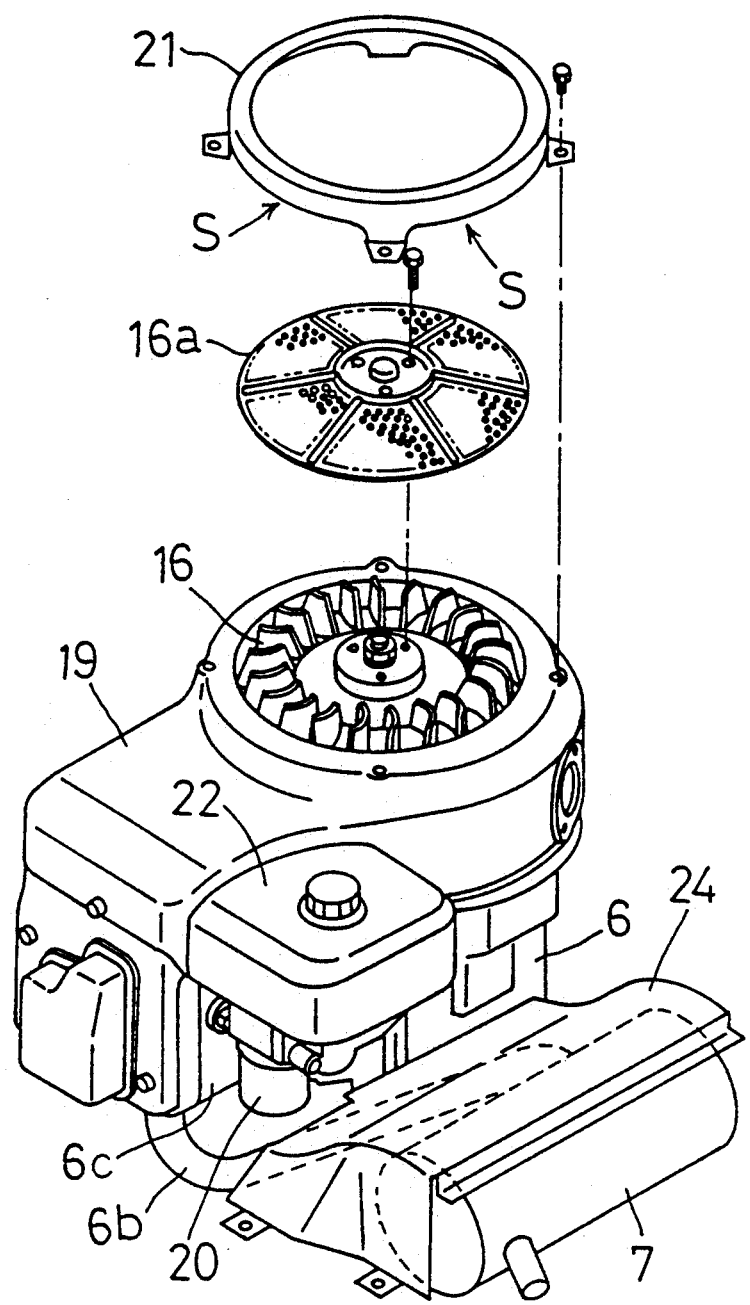
FIG. 4 is a perspective view of an engine and adjacent components.

As shown in FIG. 4, the fan 16 has a dust screen 16a mounted thereon to be rotatable together. Dust adhering to the dust screen 16a is removable by means of air flows generated by rotation, through peripheral spaces S between a fan cover 21 and dust screen 16a.

An air cleaner 22 is connected to an upper position of the carburetor 20. A fuel pump 23 is attached to a rear right side of the air guide cover 19, namely a rear right side of the engine 6.

The muffler 7 surrounded by a muffler cover 24 releases engine exhaust gas outwardly through an opening 4a formed in a rear position of the body frame 4.

The muffler cover 24 is disposed to separate the carburetor 20 and muffler 7 vertically. Further, the muffler cover 24 is shaped to extend over an exhaust manifold 6b of the engine 6 and the muffler 7 and to guide the cooling air flowing from the air guide cover 19 and engine 6. Thus, the hood 8 and muffler cover 24 defines a space which includes one cooling air passage in a region adjacent an upper surface of the muffler cover 24.

A cooling air exhaust opening "a" is formed between rear ends of the hood 8 and body frame 4 to guide and release the cooling air supplied to the carburetor 20 outwardly of the hood 8 through the air passage along the upper surface of the muffler cover 24.

Figure 2:
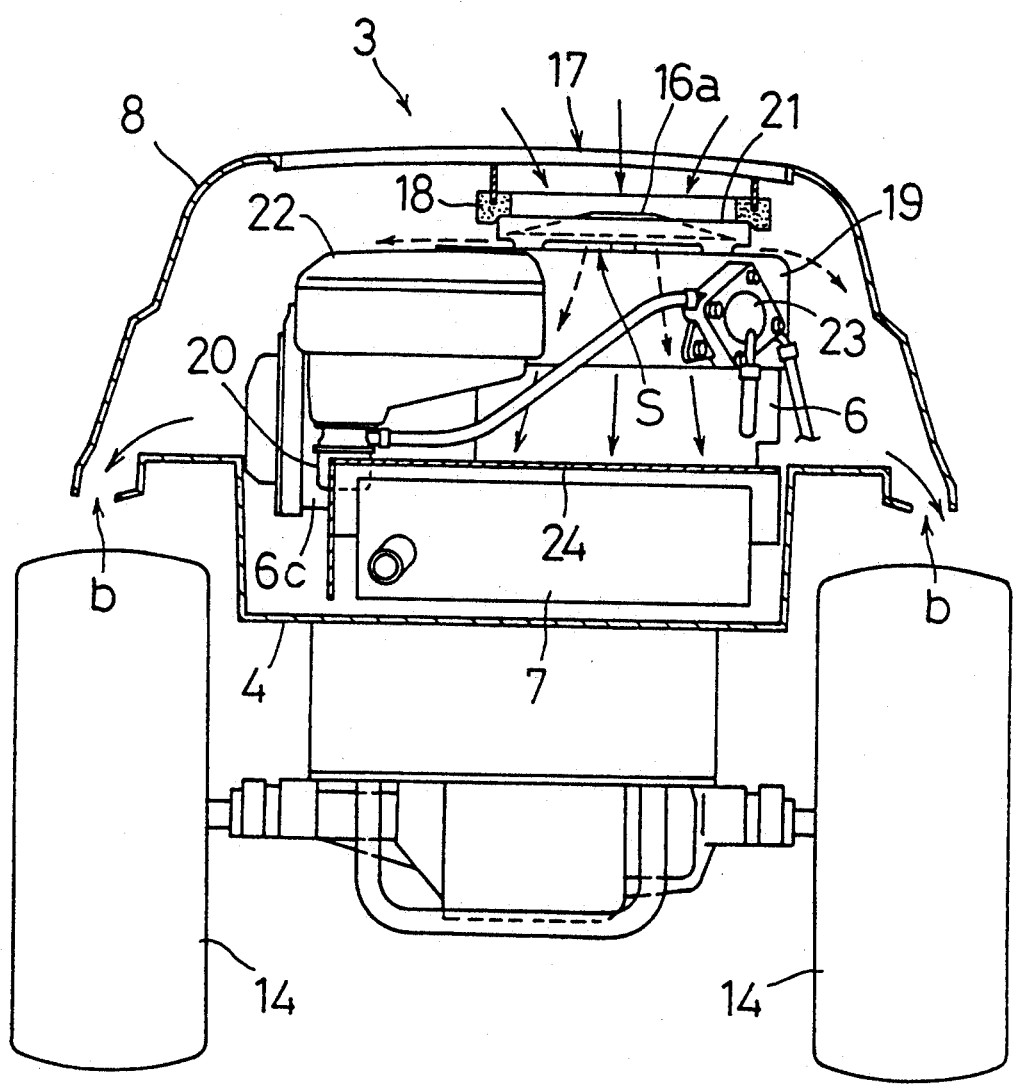
FIG. 2 is a rear view, in vertical section, of a rear portion of the lawn mower.

With the above construction, a large part of the cooling air drawn in through the air intake opening 17 defined in the upper surface of the hood 8 is guided by the annular shielding cover 18 and air guide cover 19 to the cylinder head 6c of the engine 6, while the remaining part of the cooling air is discharged through the peripheral spaces S of the fan cover 21. Part of the air flowing down the air guide cover 19 cools the carburetor 20 attached laterally of the cylinder head 6c. This part of the air then joins the air discharged through the peripheral spaces S of the fan cover 21, and flows along the upper surface of the muffler cover 24 and out through the opening "a" at the rear end of the vehicle body or through gaps "b" (see FIG. 2) between sides of the hood 8 and body frame 4. Other part of the air flowing down the air guide cover 19 is guided by a lower surface of the muffler cover 24 to cool the muffler 7 and then flow out through the opening 4a at the end of the body frame 4. The rest of the air (i.e. the part that is not guided by the upper surface or lower surface of the muffler cover 24) exits the vehicle body through a cooling air outlet 25 defined in a lower position thereof. This outlet 25 is provided in order to avoid lowering of engine cooling efficiency due to the presence of the muffler cover 24 increasing back pressure of the cooling air which would result in a reduced air flow.

An air guide plate 26 is disposed under the cooling air outlet 25 to prevent the outgoing cooling air from blowing to the belt transmissions 12 and 15.

What is claimed is:

1. A working vehicle having an air-cooled engine, comprising:
   an engine hood having an ambient air intake opening defined in an upper surface thereof;
   said engine being mounted in said hood and having a vertical output shaft, said engine further including a cylinder head, and a carburetor attached to a side wall of said cylinder head;
   a body frame supporting said engine;
   fan means disposed above said engine for drawing cooling air in through said ambient air intake opening and directing the cooling air toward said cylinder head and said carburetor;
   a muffler disposed adjacent and below said carburetor;
   a muffler cover disposed to separate said carburetor and said muffler;
   first air passage means for allowing said cooling air drawn in for cooling said cylinder head and said carburetor to flow along an upper surface of said muffler cover and out of said hood; and
   second air passage means for allowing said cooling air drawn in for cooling said cylinder head and said carburetor to flow along a lower surface of said muffler cover and out of said hood.

2. A working vehicle as defined in claim 1, wherein said second air passage means is defined by said lower surface of said muffler cover and said body frame, said body frame including an opening in a rear position thereof for exhausting the cooling air flowing through said second air passage means.

3. A working vehicle as defined in claim 1, wherein said first air passage means is defined in a space surrounded by said upper surface of said muffler cover and said hood and in a region adjacent said muffler cover, said hood including an opening in a rear position thereof for exhausting the cooling air flowing through said first air passage means.

4. A working vehicle as defined in claim 1, wherein said muffler is disposed above said body frame.

5. A working vehicle as defined in claim 4, wherein said body frame includes a cooling air outlet defined adjacent said engine.

6. A working vehicle as defined in claim 1, wherein said fan means includes a fan and an air guide cover, said air guide cover surrounding an upper region of said engine and said fan.

7. A cooling system for a working vehicle with an engine having a vertical output shaft and mounted in an engine hood having an ambient air intake opening defined in an upper surface thereof, a cylinder head provided for the engine, a carburetor attached to a side wall of the cylinder head, and a muffler disposed adjacent and below the carburetor, said cooling system comprising:
   a fan disposed above said engine for drawing cooling air in through said ambient air intake opening;
   an air guide cover surrounding an upper region of said fan and said engine for directing the cooling air drawn in by said fan toward said cylinder head and said carburetor;
   a muffler cover disposed to separate said carburetor and said muffler;
   first air passage means for allowing the cooling air drawn in for cooling the cylinder head and the carburetor to flow along an upper surface of the muffler cover and out of the hood; and
   second air passage means for allowing the cooling air drawn in for cooling the cylinder head and the carburetor to flow along a lower surface of the muffler cover and out of the hood.

* * * * *